United States Patent [19]

Tuten

[11] 3,772,535

[45] Nov. 13, 1973

[54] ACCURATE MONOSTABLE MULTIVIBRATOR

[75] Inventor: William J. Tuten, Richmond, Ind.

[73] Assignee: Avco Corporation, Richmond, Ind.

[22] Filed: Nov. 13, 1972

[21] Appl. No.: 305,780

Related U.S. Application Data

[63] Continuation of Ser. No. 147,107, May 26, 1971, abandoned.

[52] U.S. Cl. .................. 307/273, 307/215, 307/246, 307/279, 307/293

[51] Int. Cl. ......................... H03k 3/26, H03k 17/00

[58] Field of Search .................... 307/214, 215, 218, 307/246, 273, 293, 279; 328/129, 206

[56] References Cited

UNITED STATES PATENTS 3,567,962 3/1971 Formenti ............................ 307/246

*Primary Examiner*—Stanley D. Miller, Jr.

*Attorney*—Charles M. Hogan et al.

[57] ABSTRACT

A monostable multivibrator circuit provides an accurate time delay by providing an output after charging a capacitor in opposite directions to generate a predetermined threshold voltage level sequentially, first as an increasing and second as a decreasing voltage. Except for the controlling R-C network, the circuit does not require temperature compensation to provide accuracy within ± 10 percent in spite of wide variations in circuit parameters.

16 Claims, 7 Drawing Figures

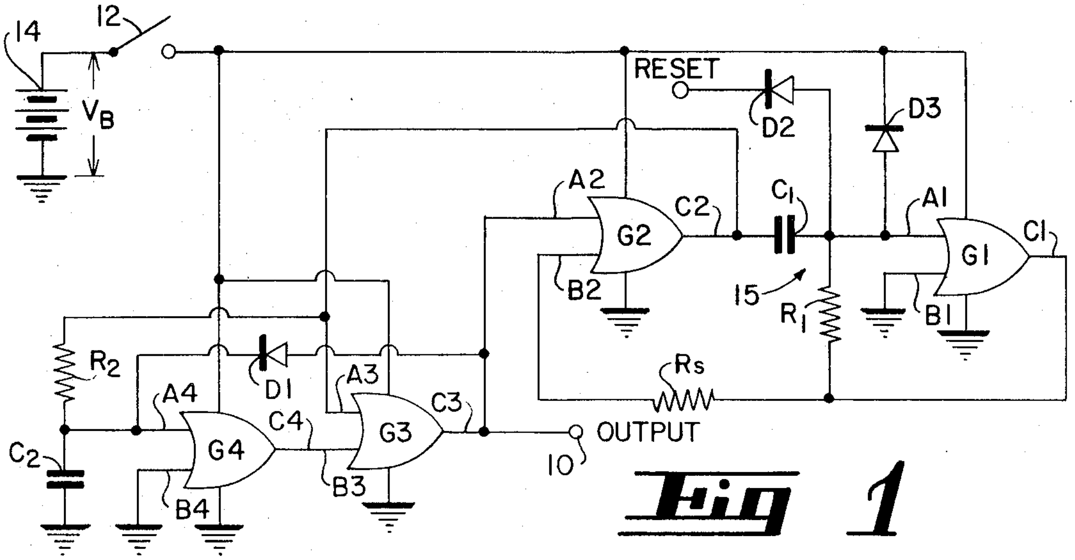
Fig 1
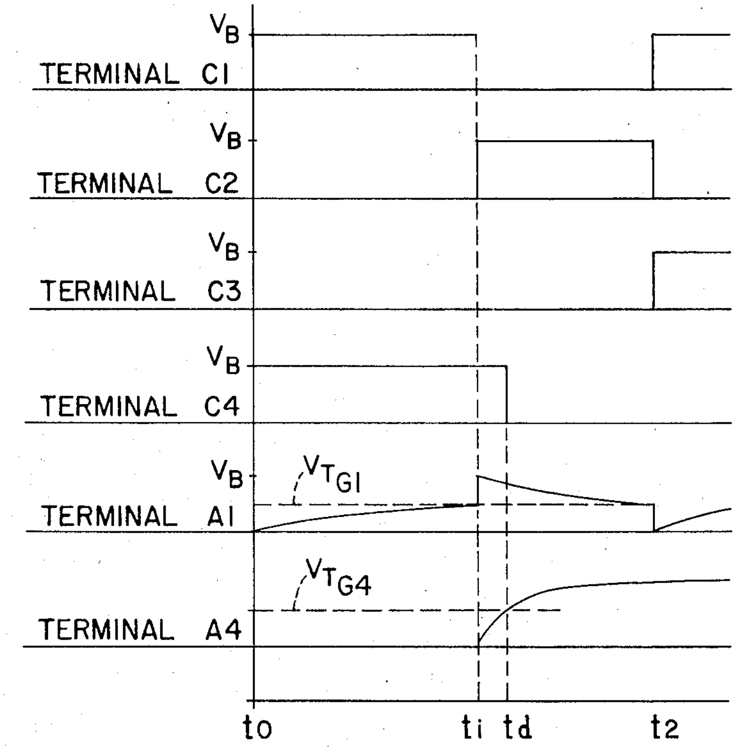
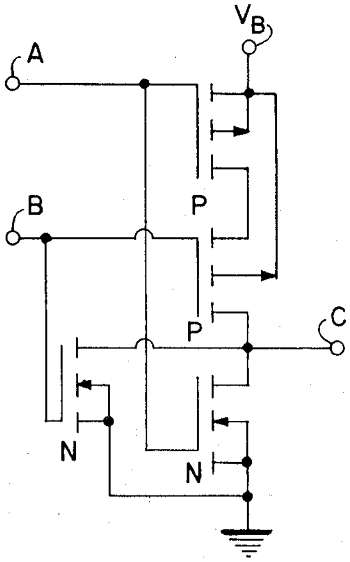
Fig 2
Fig 3
INVENTOR.
WILLIAM J. TUTEN
BY Charles M. Hogan
Irvin P. Garfinkle
ATTORNEYS.

INVENTOR.
WILLIAM J. TUTEN
BY Charles M. Hogan
Irwin P. Garfinkle
ATTORNEYS.

INVENTOR.
WILLIAM J. TUTEN
BY Charles M. Hogan
Irvin P. Garfinkle
ATTORNEYS.

ACCURATE MONOSTABLE MULTIVIBRATOR

This is a continuation of application, Ser. No. 147,107 filed May 26, 1971 now abandoned.

BACKGROUND OF THE INVENTION

There are many applications in which accurate time delay circuits are required. To maintain the desired accuracy, ± 10 percent, in accordance with the known prior art, the circuit components must be carefully selected and temperature compensated when their use is required under widely varying ambient conditions. The present invention provides an accurate, low power monostable multivibrator circuit which provides an accurate time delay but does not require temperature compensation of any circuit component except the R-C timing network. This monostable multivibrator circuit uses a Complementary Metal Oxide Silicon (CMOS) integrated circuit comprising four gates, two of which are used as inverters, a principal R-C network, a secondary R-C network and a latching diode. The system maintains an accuracy within ± 10 percent of a selected delay time, exclusive of the change in the R-C product due to temperature in spite of variations of as much as ± 33 percent in the battery level and in the threshold values of the transistor gates. The circuit consumes only leakage and transient currents and can be used for time delays ranging from a few microseconds up to several seconds. The advantages of this multivibrator over other monostable multivibrators are as follows:

1. Does not require selction of components such as the integrated circuit.
2. Uses only nanowatts of power during operation and static conditions.
3. Does not require any special temperature compensation of the circuit threshold voltages or other timing components excluding the principal R-C network.
4. Uses a smaller R-C combination than most multivibrator types because it uses sequentially the timing of the same R-C network twice.
5. Is usable over a wide operating voltage range without changing component values.
6. Provides the possibility of three individual delays from one multivibrator.

OBJECT OF THE INVENTION

It is a primary object of this invention to provide a circuit which will deliver a delayed pulse after the sequential charging of a single capacitor in opposite directions.

Another object of this invention is to provide a system of gates in combination with an R-C network to provide a pulse which is delayed a period equal to the sequential charging of the capacitor in said R-C network in opposite directions.

THE DRAWINGS

FIG. 1 is a schematic representation of one embodiment of this invention using four NOR gates;

FIG. 2 is a schematic representation of a conventional integrated circuit which comprises each NOR gate;

FIG. 3 is a series of curves showing the embodiment of FIG. 1;

Figures 4, 5:
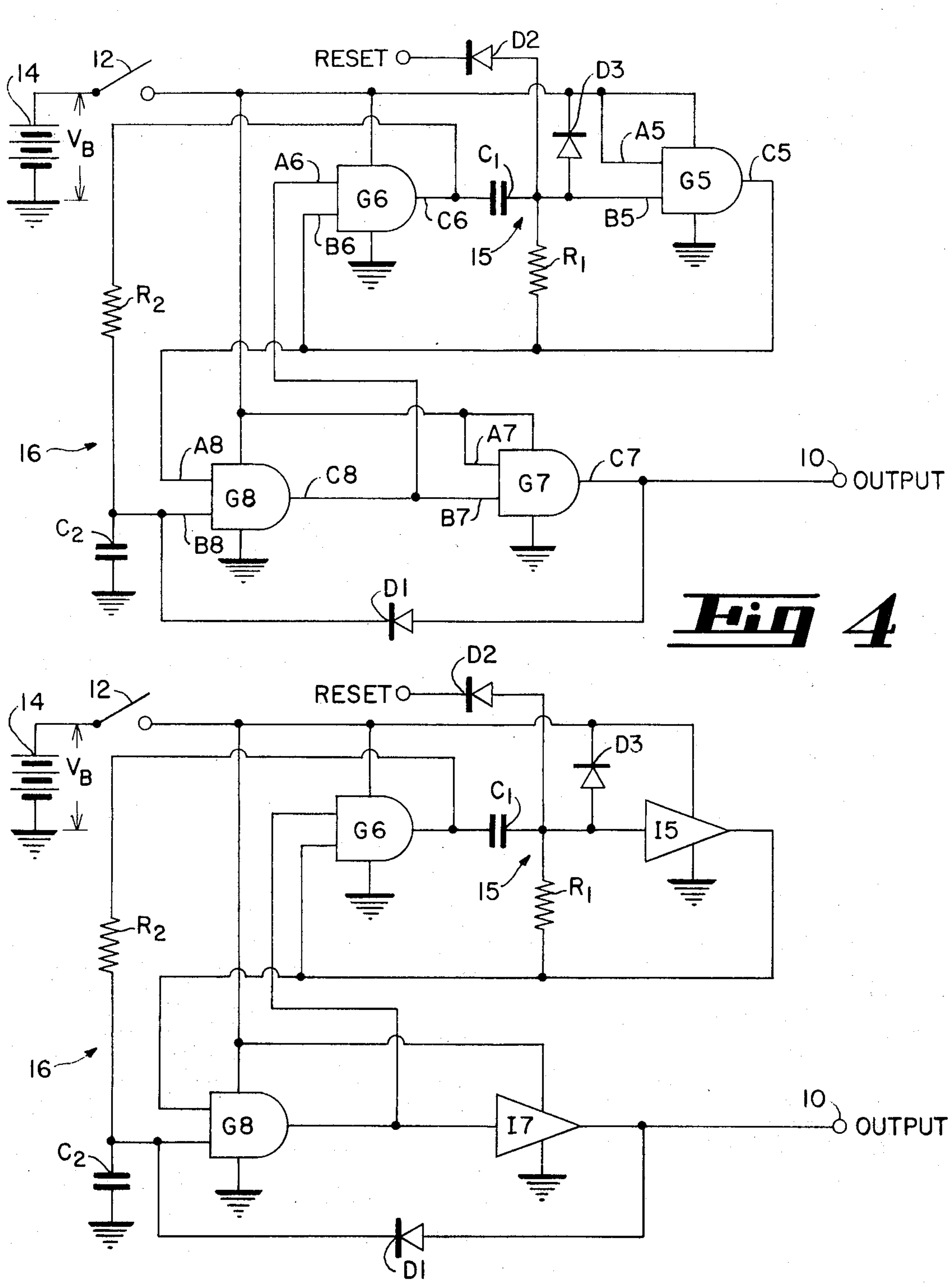
FIG. 4 is another embodiment of this invention using four NAND gates.
Figures 6, 7:
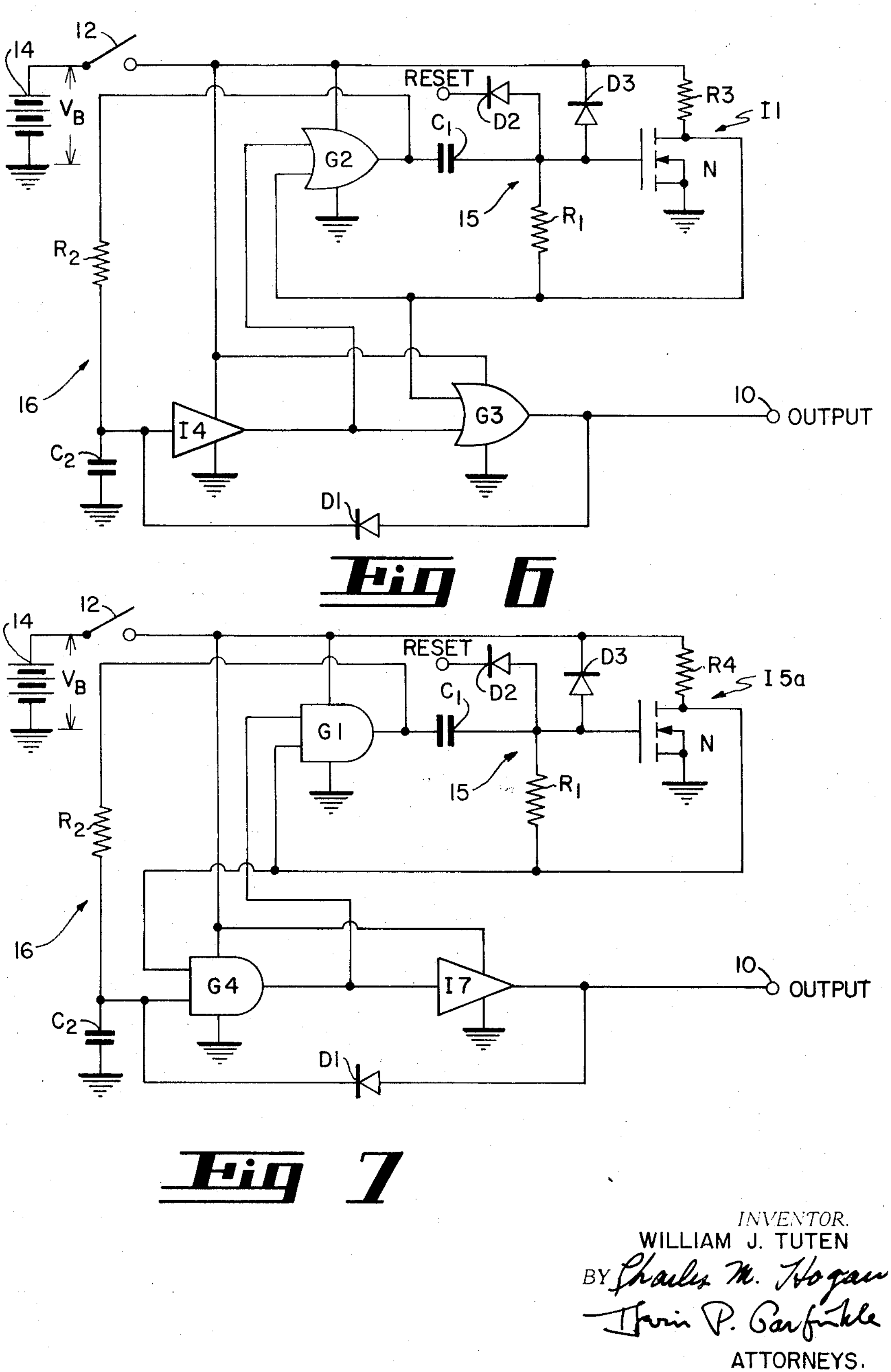

FIGS. 5, 6 and 7 of this invention are additional modifications of this invention showing the substitution of inverters for certain of the gates.

DESCRIPTION OF THE EMBODIMENT OF FIG. 1

The arrangement shown in FIG. 1 is a monostable multivibrator which functions to provide an accurate time delay. As illustrated, the multivibrator includes four NOR gates G1, G2, G3 and G4. The object of the circuit is to provide a pulse at output terminal 10 after a predetermined delay following the closing of a switch 12 to a battery 14 or other B+ supply.

The battery 14 supplies the operating energy for each of the gates which will have either a high output or a low output, depending on the conditions at its input terminals. Each NOR gate G1–G4 has two input terminals A and B and an output terminal C and operates in accordance with the following logic:

| A | B | C |
|---|---|---|
| 1 | 0 | 0 |
| 0 | 1 | 0 |
| 1 | 1 | 0 |
| 0 | 0 | 1 |

If the input voltage at either the A terminal or the B terminal is high (1), the output at the terminal C will be low (0). Only if the inputs at both terminals A and B are low (0) will the output at terminal C be high (1).

The input terminal A1 of gate G1 is supplied with the voltage developed in an R-C charging network 15 comprised of a resistor $R_1$ and a capacitor $C_1$, while the other input terminal B1 is permanently connected to ground, so that gate G1 acts as an inverter. The output terminal C1 is connected to the free end of resistor $R_1$ and through a resistor Rs to the input terminal B2 of the NOR gate G2. The other input terminal A2 of gate G2 is provided with the output voltage appearing at the output terminal C3 of gate G3.

The input terminal A3 of gate G3 is supplied with the output voltage appearing at the output terminal C2 of gate G2 while the input terminal B3 is supplied from the output terminal C4 of gate G4. The input terminal B4 of gate G4 is permanently connected to ground while the input terminal A4 is supplied from two sources; first, through an R-C network comprised of resistor $R_2$ and capacitor $C_2$ supplied from the output terminal C2 of the gate G2; and second, from the output terminal C3 of the gate G3 through a diode D1.

A diode D2 is connected to the input terminal A1 of gate G1 for applying a reset pulse.

A diode D3, or its equivalent, is connected between the input terminal A1 and the high voltage supply $V_B$. The diode may be located in the integrated circuit.

The circuit for each NOR gate G1–G4 is shown in detail in FIG. 2 and is comprised of a standard RCA COS/MOS integrated circuit, the construction and operation of which are described in RCA Data Sheet File No. 345.

Initially (prior to time $t_0$ in FIG. 3) the output at each output terminal C1–C4 is low or 0 because the battery 14 is not connected. At time $t_0$ immediately after the switch 12 is closed to operatively energize the NOR gates, the NOR gate G1 will have a high output $V_B$ (approximately equal to the battery voltage) because the voltage at each of its input terminals A1 and B1 is low. Since high voltage output at the terminal C1 of gate G1 is applied to the input terminal B2 of gate G2 through the resistor Rs, the output voltage at terminal C2 remains low. The high voltage $V_B$ at the output terminal C1 is also applied to the R-C network 15 and begins to charge capacitor $C_1$.

The low voltage at output terminal C2 initially provides a low voltage for the input terminals A3 and A4. Since the terminal B4 is permanently at ground the output at terminal C4 is initially high. Since this high output is applied to the terminal B3, a low output at the output terminal C3 will result.

Thus at time $t_0$, as seen in FIG. 3, the output at terminal C1 is high, the output at terminal C2 is low, the output at terminal C3 is low and the output at terminal C4 is high. This condition will not change until the voltage at terminal A1 rises to the threshold level $V_{TG1}$ of gate 1. This condition occurs after a time $t_1$ determined by the charging rate of capacitor $C_1$.

When the threshold level is reached at time $t_1$, the voltage then applied to the terminal A1 of the gate G1 is sufficient to change the state of the gate G1. This changes the voltage at the output terminal C1 from high to low. Since the voltage appearing at terminal C1 is applied to the input terminal B2 of the gate G2, and since the terminal A2 was initially at a low voltage, the gate G2 also changes state so that the voltage at the output terminal C2 is moved to a high voltage $V_B$. The high voltage $V_B$ from gate G2 is applied from the terminal C2 to the terminal A4 of the gate G4 through the secondary $R_2$–$C_2$ network to delay the changing of the state of this gate, i.e., maintaining its output at a high level until time $t_d$, thereby assuring that the gate G3 does not change state at time $t_1$. In addition, the high voltage $V_B$ at terminal C2 is applied directly to the input terminal A3 of the gate 3.

As seen in FIG. 3, at time $t_1$ the output voltage at terminal C1 is low, the output voltage at terminal C2 is high, the output voltage at terminal C3 is low and the output voltage at terminal C4 is temporarily high because capacitor $C_2$ is not yet charged. In addition, the voltage at terminal A1 instantaneously rises from $V_{TG1}$ to the battery voltage $V_B$ when gate G1 changes state due to the clamping action of diode D3.

At time $t_1$ the capacitor $C_2$ starts to charge, raising the level of terminal A4 to the threshold level $V_{TG4}$ of the gate G4. At this point, time $t_d$, the gage G4 changes state so that its output at terminal C4 becomes low. Gate G3 does not change state yet because the voltage at its input terminal A3 is still high; however, the capacitor $C_1$ has been discharging since time $t_1$ causing the voltage level $V_B$ at terminal A1 to reduce to the threshold level $V_{TG1}$ of the gate G1. When it reaches this level, at time $t_2$, the gate G1 changes state so that its output again becomes high. This causes the changing of the state of the gate G2 so that the voltage at terminal C2 becomes low. This results in a low voltage on each of the terminals A3 and B3 of the gate G3 causing it to change state from a low voltage to a high voltage and producing a high output at the terminal 10.

The feedback diode D1 clamps the output of the NOR gate G4. The output of NOR gate G3 is also coupled to the input of NOR gate G2 to prevent its again changing state until the next power delay activation. Such activation is initiated by applying a trigger voltage to the input terminal A1 of the gate G1 through a diode D2 to discharge the capacitors $C_1$ and $C_2$ to permit the starting of another cycle.

The particular embodiment shown in FIG. 1 is a monostable multivibrator circuit. It has several advantageous features. It is accurate, requires low power, and does not require temperature compensation of any components except the principal R-C network.

Basically, after the closing of switch 12 the gate G3 changes state after the occurrence of two events. The first event is the charging of the capacitor $C_1$ from 0 volts to the threshold level $V_{TG1}$ of the gate G1, whereupon the gate G1 changes state. This action effectively reverses the connections of the battery voltage $V_B$ to the resistance capacitance network 15 and discharges the capacitor $C_1$. The second event is the discharge of the capacitor $C_1$ in the opposite direction to cause the voltage level $V_B$ on terminal A1 to drop to the threshold level $V_{TG1}$ of the gate G1 to again cause it to change state. In essence, the circuit functions to connect the voltage $V_B$, first to one side of the network 15 to charge it in one direction, and then to connect the voltage $V_B$ to the other side of the network 15 to charge it in the opposite direction. This function is provided by the gates G1 and G2. Any double-pole double-throw switch will also serve to provide this function. The remaining circuitry functions primarily to produce the delayed changing of the state of the gate G3 after the occurrence of these two events.

The circuit's stability results from the fact that any changes in operation resulting from changes in temperature are automatically compensated by the inherent nature of the timing circuit. That is to say, an increase in the first charging time of the capacitor $C_1$ is automatically compensated by a decrease in the second charging time of the capacitor $C_1$. For example, referring to FIG. 3, if the threshold voltage of any gate should vary, the increase in time $t_1$ to reach an increased threshold will be approximately compensated by the subsequent decrease in time to charge down from $V_B$ to the same threshold. Additionally, with changes in the value of $V_B$ of up to 33 percent, the time delay varies less than 10 percent due to the inherent proportionality between $V_B$ and $V_{TG1}$.

Each of the NOR gates G1–G4 consists of a Complementary Metal Oxide Silicon (CMOS) integrated circuit which is a standard commercial item, the operation of which is described in RCA Data Sheet File No. 345. As shown in FIG. 2, each of the NOR gates consists of two P-channel and two N-channel devices connected so that in static conditions either the N-channel device or the P-channel device is on, but not both. These circuits achieve minimum power drain because they are complementary devices, the P and N channels insuring that one of the transistors is "on" while the other is "off." With one of the gate inputs grounded, a NOR gate effectively becomes an inverter.

The time required to charge the capacitor $C_1$ to the threshold voltage $V_{TG1}$ of the NOR gate G1 is:

$$t_1 = R_1C_1 \ ln \ [V_B/V_B - V_{TG1}] \qquad \text{(Eq. a)}$$

The time for charging the capacitor $C_1$ to lower the voltage on terminal $A_1$ below the threshold level of gate G1 is:

$$t_2 - t_1 = R_1C_1 \ ln \ [V_b/V_{TG1}] \qquad \text{(Eq. b)}$$

The summation of equations (a) and (b) is equal to the desired time delay.

While the circuitry illustrated in FIG. 1 is entirely adequate for performing the required delay function, the invention is not limited thereto but may be implemented by many other configurations including those illustrated in FIGS. 4 through 7.

DESCRIPTION OF THE EMBODIMENT OF FIG. 4

The arrangement shown in FIG. 4 comprises four NAND gates G5, G6, G7 and G8. As in the embodiment of FIG. 1, it is the object of this circuit to provide an output pulse at the terminal 10 after a predetermined delay period following the closing of the switch 12 to the battery 14 which supplies the operating energy for each of the NAND gates.

The NAND gate operates in accordance with the following logic:

| A | B | C |
|---|---|---|
| 0 | 0 | 1 |
| 0 | 1 | 1 |
| 1 | 0 | 1 |
| 1 | 1 | 0 |

If the input voltage at either of the terminals A or B is low, the voltage at the output terminal C is high. Only if the inputs at both terminals A nd B are high will the output at terminal C be low. If one of the input terminals of a NAND gate is tied to the battery, the NAND gate, like a NOR gate, acts as an inverter. The system operation using the NAND gate therefore closely resembles the system operation using the NOR gate.

The input terminal A5 of gate G5 is connected to the battery 14 through a switch 12, while the other input terminal B5 is supplied with the voltage developed in the R-C charging network 15. The output terminal C5 of gate G5 is connected to the free end of resistor $R_1$, to the input terminal B6 of NAND gate G6, and to the input terminal A8 of gate G8. The input terminal A6 of the gate G6 is provided with the voltage appearing at the output terminal C8 of gate G8. The terminal B8 of gate G8 is supplied from two sources, one from the output terminal C6 through R-C network 16, and the other from the output terminal C7 through clamping diode D1. The input terminal A7 of gate G7 is connected to the battery 14 through switch 12, while its input terminal B7 is connected to the output terminal C8 of gate G8.

Upon application of battery power, the output at NAND gate terminal C5 will be high (1) because initially there is a low (0) voltage on the input terminal B5. The voltage at NAND gate output terminal C6 will be low because the voltage at both input terminals A6 and B6 will be high. The voltage on terminal B6 is high since it is connected to the high voltage appearing at terminal C5. The voltage at terminal A6 is high because it is connected to the high voltage appearing at the NAND gate output terminal C8. The voltage at NAND gate terminal C8 is high because input terminal B8 is connected to ground through the capacitor $C_2$ which is initially uncharged. The output terminal C7 of NAND gate G7 is low because its terminal B7 is connected to the high voltage at terminal C8, and its terminal A7 is connected to the battery 14.

Since the voltage at output terminal C5 is high and the voltage at output terminal C6 is low, capacitor $C_1$ begins to charge through resistor $R_1$. When the terminal B5 reaches the threshold of gate G5, the gate G5 changes state, causing its output at terminal C5 to become low. This produces a low voltage at input gate B6 which results in a change of state of Gate G6 causing its output at terminal C6 to become high.

When the output at terminal C6 of NAND gate G6 goes high, capacitor $C_1$ in the network 15 is discharged through diode D3, whereupon it is charged in the opposite direction through the resistor $R_1$. At the same time, but at a much faster rate, capacitor $C_2$ in the network 16 is charged through resistor $R_2$. Therefore, a high voltage is applied to input terminal B8 before the threshold level of gate G5 is reached at terminal B5. A high voltage appears at terminal A8 when the gate G5 changes state, and this occurs when the capacitor $C_1$ is again charged to place a voltage on terminal B5 below the threshold level of gate G5. When this occurs, the voltage at input terminal A8 becomes high and gate G8 changes to a low voltage state. The low voltage at terminal C8 is applied to terminal B7 causing gate G7 to change state to provide a high output from the terminal C7. This is the delayed voltage output which is applied to the terminal 10.

Thus, as in the FIG. 1 embodiment, a delayed voltage output is developed in a period of time determined by the charging times in opposite directions of a single capacitor $C_1$. A clamping diode D1 between the terminal C7 and the terminal B8 and the network 16 insures that the circuit provides only one timing output. Reset of the timer is achieved by shorting the input of the NAND gate G5 to ground, thereby discharging the capacitor $C_1$ and $C_2$.

THE EMBODIMENT OF FIGS. 5, 6 AND 7

The embodiment illustrated in FIG. 5 is almost identical with the embodiment shown in FIG. 4 except that the NAND gates G5 and G7 are replaced by inverters I5 and I7, respectively. The circuit of FIG. 5 works in exactly the same manner as the circuit of FIG. 4 except that the power requirements are increased.

The embodiment shown in FIG. 6 is essentially the same as that shown in FIG. 1 except that two of the NOR gates G1 and G4 are replaced by inverters I1 and I4. The inverter I4 consists of an N-channel MOS transistor and a resistor R3. Operation of this circuit is identical to FIG. 1 except for the increased power requirements.

Similarly, the embodiment of FIG. 7 is identical with that of FIG. 5 except that the inverter I5 is replaced by an inverter I5a consisting of a conventional N-channel MOS transistor and a resistor R4. Again the power requirements are increased.

I claim:

1. A circuit for generating a delayed signal comprising:

a resistor and a capacitor connected to provide a two-terminal resistance-capacitance charging network;

a source of direct voltage;

an output circuit;

connections from said source across the terminals of said network for charging said capacitor in one direction from a given low voltage to a predetermined voltage;

means responsive to the charging of said capacitor to a predetermined voltage level for reversing said connections across the terminals of said network whereby said capacitor is discharged in the opposite direction, the charging and discharging of said capacitor both being through said resistor;

connections from said source to said output circuit; and means responsive to the successive charging and discharging of said capacitor to said predetermined voltage for altering said connections from said source to said output circuit to generate said delayed signal.

2. The invention as defined in claim 1, and a clamping diode connected between said voltage source and the junction of said resistor and capacitor, said diode being poled to oppose conduction from said source to said junction.

3. A delay circuit for generating a signal after a time delay, said circuit comprising:

a two-terminal resistance-capacitance charging network having first and second terminals, said network comprising a resistor and a capacitor connected in series between said terminals;

a two-terminal voltage source having first and second terminals;

first, second, third and fourth electronic switches each having first and second input terminals and an output terminal, each of said electronic switches having first and second operating states, the first state providing a connection from its output terminal to the first terminal of said source, the second state providing a connection from its output terminal to the second terminal of said source, said electronic switches being in said first state except when a given voltage level is present at both of said input terminals, said first electronic switch being initially in its first operating state;

means connecting the first and second terminals of said network to the input terminals of said first and second electronic switches, respectively;

a connection from the output terminal of the first electronic switch to the second input terminal of the second electronic switch, whereby said second electronic switch is initially in a second operating state;

a connection from the junction of said resistor and capacitor to the first input terminal of said first electronic switch, the second input terminal of the first electronic switch being connected to the second terminal of said source;

a connection between the output terminal of said third electronic switch and the first input terminal of said second electronic switch;

a connection from the output terminal of the second electronic switch to the first input terminal of said third electronic switch;

a second two-terminal resistance-capacitance charging network including a second resistor and a second capacitor connected in series between its terminals, one of said terminals being connected to the output terminal of said second electronic switch, the other of said terminals being connected to the second terminal of said source;

a connection from the junction of said second resistor and said second capacitor to the first input terminal of said fourth electronic switch, said second input terminal of said fourth electronic switch being connected to the second terminal of said source;

a connection from the output terminal of said fourth electronic switch to the second input terminal of said third electronic switch, whereby said third electronic switch is initially in its second operating state and said fourth electronic switch is initially in its first operating state; and a clamping diode connected between the junction of said capacitor and resistor and the first terminal of said source;

said first electronic switch changing to its second operating state when said capacitor is charged to a predetermined level and said second switch is changed to its first operating state, whereby said network is charged in the opposite direction to said predetermined level, said third electronic switch changing to its second operating state when said capacitor is charged to said level in the opposite direction, said time delay signal being derived from the output terminal of said third electronic switch.

4. The invention as defined in claim 3 wherein said second resistance-capacitance network is chargeable at a rate faster than the charging rate of said first resistance-capacitance network.

5. The invention as defined in claim 4 and a clamping diode connected between the output terminal of said third electronic switch and the first input terminal of said fourth electronic switch.

6. The invention as defined in claim 5 wherein each of said electronic switches is a NOR gate.

7. The invention as defined in claim 6 wherein said four NOR gates are comprised of a Complementary Metal Oxide Silicon integrated circuit.

8. The invention as defined in claim 5 wherein said first and third electronic switches are inverters.

9. A delay circuit for generating a signal after a time delay, said circuit comprising:

a two-terminal resistance-capacitance charging network having first and second terminals, said network comprising a resistor and a capacitor connected in series between said terminals;

a two-terminal voltage source having first and second terminals;

first, second, and third electronic switches each having first and second input terminals and an output terminal, each of said electronic switches having first and second operating states, the first state providing a connection from its output terminal to the first terminal of said source, the second state providing a connection from its output terminal to the second terminal of said source, said electronic switches being in said first state except when a given voltage level is present at both of said input terminals, said first electronic switch being initially in its first operating state;

means connecting the first and second terminals of said network to the output terminals of said first and second electronic switches, respectively;

a connection from the output terminal of the first electronic switch to the second input terminal of the second electronic switch, whereby said second electronic switch is initially in a second operating state;

a connection from the junction of said resistor and capacitor to the first input terminal of said first electronic switch, the second input terminal of the first electronic switch being connected to the second terminal of said source;

a connection between the output terminal of said third electronic switch and the first input terminal of said second electronic switch;

a connection from the output terminal of the second electronic switch to the first input terminal of said third electronic switch, the second input terminal being connected to said second terminal of said source;

a second two-terminal resistance-capacitance charging network including a second resistor and a second capacitor connected in series between its terminals, one of said terminals being connected to the output terminal of said second electronic switch, the other of said terminals being connected to the second terminal of said source;

a connection from the junction of said second resistor and said second capacitor to the first input terminal of said third electronic switch, said second input terminal of said third electronic switch being connected to the second terminal of said source; and a clamping diode connected between the junction of said capacitor and resistor and the first terminal of said source;

said first electronic switch changing to its second operating state when said capacitor is charged to a predetermined level and said second switch is changed to its first operating state, whereby said network is charged in the opposite direction to said predetermined level, said third electronic switch changing to its second operating state when said capacitor is charged to said level in the opposite direction, said time delay signal being derived from the output terminal of said third electronic switch.

10. The invention as defined in claim 9 wherein said second resistance-capacitance network is chargeable at a rate faster than the charging rate of said first resistance-capacitance network.

11. The invention as defined in claim 10 and a clamping diode connected between the output terminal of said third electronic switch and the first input terminal of said fourth electronic switch.

12. The invention as defined in claim 11 wherein each of said electronic swithces is a NAND gate.

13. The invention as defined in claim 12 wherein said four NAND gates are comprised of a Complementary Metal Oxide Silicon integrated circuit.

14. The invention as defined in claim 12, and a fourth electronic switch having first and second input terminals and first and second output terminals, said first output terminal being connected to the one terminal of said source only when said predetermined voltage level is applied to both of said input terminals, said second output terminal being connected to said other terminal of said source only when both of said predetermined voltage levels are not applied to both of said input terminals;

a connection from the first input terminal to said one terminal of said source; and a connection from the output terminal of said third electronic switch to the second input terminal of said fourth electronic switch.

15. The invention as defined in claim 14 wherein said fourth electronic switch is a NAND gate.

16. The invention as defined in claim 14 wherein said first and fourth electronic switches are inverters.

* * * * *

PO-1050
(5/69)

UNITED STATES PATENT OFFICE
CERTIFICATE OF CORRECTION

Patent No. 3,772,535 Dated November 13, 1973

Inventor(s) William J. Tuten

It is certified that error appears in the above-identified patent and that said Letters Patent are hereby corrected as shown below:

Column 7, line 32, "input" should read --- output ---.

Signed and sealed this 9th day of April 1974.

(SEAL)
Attest:

EDWARD M.FLETCHER,JR.
Attesting Officer

C. MARSHALL DANN
Commissioner of Patents